US008614161B2

(12) United States Patent
Lee et al.

(10) Patent No.: US 8,614,161 B2
(45) Date of Patent: Dec. 24, 2013

(54) $CO_2$ REFORMING CATALYST COMPOSITION (75) Inventors: Seung Jae Lee, Suwon-si (KR); InHyuk Son, Yongin-si (KR); Chan Ho Pak, Seoul (KR); Hyun Chul Lee, Hwaseong-si (KR); Jeong Kuk Shon, Cheonan-si (KR); Young Gil Jo, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 281 days.

(21) Appl. No.: 13/108,200

(22) Filed: May 16, 2011

(65) Prior Publication Data

US 2012/0184430 A1 Jul. 19, 2012

(30) Foreign Application Priority Data

Jan. 14, 2011 (KR) ........................ 10-2011-0004135

(51) Int. Cl.
B01J 23/00 (2006.01)
B01J 21/00 (2006.01)
B01J 20/00 (2006.01)
B01J 29/00 (2006.01)
B01J 35/00 (2006.01)

(52) U.S. Cl.
USPC ................ 502/84; 502/60; 502/87; 502/240; 502/300; 502/303; 502/304; 502/319; 502/321; 502/324; 502/325; 502/337; 502/338; 502/339; 502/340; 502/343; 502/344; 502/345; 502/349; 502/355; 502/439

(58) Field of Classification Search
USPC ................ 502/60, 84, 87, 240–439
See application file for complete search history.

(56) References Cited

U.S. PATENT DOCUMENTS

| | | | | |
|---|---|---|---|---|
| 5,672,556 | A * | 9/1997 | Pinnavaia et al. | 502/63 |
| 6,319,872 | B1 * | 11/2001 | Manzer et al. | 502/66 |
| 6,387,843 | B1 | 5/2002 | Yagi et al. | |
| 6,476,085 | B2 * | 11/2002 | Manzer et al. | 518/715 |
| 7,566,678 | B2 * | 7/2009 | Font Freide et al. | 502/158 |
| 8,008,223 | B2 * | 8/2011 | Garcia-Martinez | 502/63 |
| 2003/0064279 | A1 | 4/2003 | Yoshida et al. | |
| 2004/0266612 | A1 | 12/2004 | Hayes et al. | |
| 2008/0069741 | A1 | 3/2008 | Koermer et al. | |
| 2010/0133147 | A1 * | 6/2010 | Chaumonnot et al. | 208/144 |
| 2012/0184430 | A1 | 7/2012 | Lee et al. | |

FOREIGN PATENT DOCUMENTS

| | | |
|---|---|---|
| JP | 2003-109629 A | 4/2003 |
| KR | 1020030027802 A | 4/2003 |
| KR | 1020040027888 A | 4/2004 |
| KR | 1020090057127 A | 6/2009 |
| KR | 1020120082697 A | 7/2012 |

OTHER PUBLICATIONS

Yagi, et al., "Development of Sythesis Gas Production Catalyst and Process," *Prepr, Pap.-Am. Chem. Soc., Div. Fuel Chem.*, vol.49, No. 2, pp. 652-653 (2004).

* cited by examiner

*Primary Examiner* — Cam N. Nguyen
(74) *Attorney, Agent, or Firm* — Harness, Dickey & Pierce, P.L.C.

(57) ABSTRACT

A $CO_2$ reforming catalyst composition includes a hydroxyl group-containing porous oxide, and a composite porous catalyst supported by a porous supporter. The composite porous catalyst includes a catalyst metal.

10 Claims, 6 Drawing Sheets

$CO_2$ REFORMING CATALYST COMPOSITION

CROSS REFERENCE TO RELATED APPLICATION

This application claims priority to and the benefit of Korean Patent Application No. 10-2011-0004135 filed in the Korean Intellectual Property Office on Jan. 14, 2011, the entire contents of which are incorporated herein by reference.

BACKGROUND

1. Field

Example embodiments relate to a $CO_2$ reforming catalyst composition.

2. Description of the Related Art

Decreasing generation of carbon dioxide, which is the leading greenhouse gas, has become a globally important matter. In addition to demand for a $CO_2$ decrease due to $CO_2$ discharge regulations, studies on converting $CO_2$ to a specific chemical material to create added value are progressing. A method of converting $CO_2$ into $H_2$ and CO, which are used as precursors of chemical materials, utilizes a high temperature dry catalyst reaction of $CO_2$ and $CH_4$. The aforementioned method may prevent $CO_2$ generation and recycle $CO_2$ as a useful chemical material, and thus, has been steadily studied in chemical factories and oil refineries where a relatively large amount of $CO_2$ is generated.

SUMMARY

At least one embodiment is related to a $CO_2$ reforming catalyst composition having improved carbon deposition resistance and increased activity.

According to an example embodiment, a $CO_2$ reforming catalyst composition includes a hydroxyl group-containing porous oxide, and a composite porous catalyst supported by a porous supporter. The composite porous catalyst includes a catalyst metal.

The hydroxyl group-containing porous oxide may include about 0.3 to 3.0 mmol/g of hydroxyl groups. The weight ratio of the hydroxyl group-containing porous oxide and the composite porous catalyst may be about 5:5 to 1:9.

The hydroxyl group-containing porous oxide and the porous supporter may be independently selected from silica, alumina, clay, zeolite, or a combination thereof. The hydroxyl group-containing porous oxide may be selected from mesoporous silica, mesoporous zeolite, alumina aerosol, or a combination thereof.

The catalyst metal may be selected from Ni, Co, Cr, Mn, Mo, Ce, Zr, Fe, Ir, K, Ca, Mg, La, Sr, Cu, Zn, Pd, Pt, Ru, Rh, Au, or a combination thereof. The porous supporter may have a specific surface area of about 50 to 1000 $m^2/g$. Pores of the porous supporter may have an average maximum diameter of about 2 to 50 nm.

The composite porous catalyst may include the supported catalyst metal in the concentration of about 2 to 15 wt %. An amount of carbon deposition may be about 0.01 to 0.1 mg/hr per 1 g of the composite porous catalyst when a $CO_2$ reforming reaction is performed at 700° C. using the $CO_2$ reforming catalyst composition.

A $CO_2$ conversion rate of about 90 to 100% based on an equilibrium conversion rate may be obtained when a $CO_2$ reforming reaction is performed using the $CO_2$ reforming catalyst composition.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

This disclosure will be described more fully hereinafter in the following detailed description, in which some but not all example embodiments of this disclosure are described. This disclosure may be embodied in many different forms and is not be construed as limited to example embodiments set forth herein; rather, these embodiments are provided so that this disclosure will satisfy applicable legal requirements.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The $CO_2$ reforming catalyst composition according to an example embodiment includes a hydroxyl group-containing porous oxide and a composite porous catalyst including a catalyst metal supported by a porous supporter.

The hydroxyl group-containing porous oxide may include about 0.3 to 3.0 mmol/g of hydroxyl groups. When the hydroxyl group-containing porous oxide includes the hydroxyl groups in the density of the above range, the $CO_2$ reforming catalyst composition may progress a catalyst reaction at an appropriate reaction temperature to achieve a predetermined or given conversion rate and yield.

The weight ratio of the hydroxyl group-containing porous oxide and the composite porous catalyst may be about 5:5 to 1:9. When the $CO_2$ reforming catalyst composition has the above mixing ratio, the catalyst composition may progress the catalyst reaction at an appropriate reaction temperature to achieve a predetermined or given conversion rate and yield.

The porous oxide and the porous supporter may be independently selected from silica, alumina, clay, zeolite, or a combination thereof. The hydroxyl group-containing porous oxide includes a plurality of hydroxyl groups connected to the surface of pores formed inside the oxide. Specific examples of the porous oxide including a plurality of hydroxyl groups may include mesoporous silica, mesoporous zeolite, alumina aerosol, and a combination thereof. The catalyst metal included in the composite porous catalyst may be selected from Ni, Co, Cr, Mn, Mo, Ce, Zr, Fe, Ir, K, Ca, Mg, La, Sr, Cu, Zn, Pd, Pt, Ru, Rh, Au, or a combination thereof.

The $CO_2$ reforming catalyst composition may be used as a catalyst for a $CO_2$ reforming reaction, which is explained in detail hereinafter. A mechanism of $H_2$ and CO generation by a high temperature dry catalyst reaction of $CO_2$ and $CH_4$ is as shown in the following Reaction Scheme 1.

$$CH_4 + CO_2 \rightarrow 2CO + 2H_2 \quad \Delta H_o = 247.3 \text{ kJ/mol}$$ [Reaction Scheme 1]

The degree of progression of the reaction in Reaction Scheme 1 is determined according to thermodynamic equilibrium. Since the carbon dioxide reforming reaction in Reaction Scheme 1 is a significantly endothermic reaction, the reaction is commonly actively progressed at a relatively high temperature of about 660° C. or more. Although the higher reaction temperature may be favorable for the carbon dioxide reforming reaction, raising the temperature by an undesirable amount may practically cause various problems. The catalyst reaction may be progressed at an appropriate reaction temperature of about 600 to 1000° C., and studies on lowering the reaction temperature are progressing to reduce energy consumption.

The $CO_2$ reforming catalyst composition may also be used in a wet catalyst reaction of the $CO_2$ reforming reaction according to the following Reaction Scheme 2.

$$3CH_4 + CO_2 + 2H_2O \rightarrow 4CO + 8H_2 \quad \Delta H_o = 219 \text{ kJ/mol}$$ [Reaction Scheme 2]

The $CO_2$ reforming reaction is performed by adding water, and $H_2/CO$ in the mole ratio of about 2 may be obtained in the final product.

In the $CO_2$ reforming catalyst composition, the hydroxyl group of the hydroxyl group-containing porous oxide functions to absorb water due to its hydrophilic properties, and thus the hydroxyl group-containing porous oxide maintains water. The water retained in the hydroxyl group-containing porous oxide is provided as a reactant of Reaction Scheme 2. As the result, the utilization coefficient of water may increase when the $CO_2$ reforming catalyst composition is included in the $CO_2$ reforming reaction of Reaction Scheme 2, thereby decreasing the amount of vapor injection and increasing the $CH_4$ conversion rate. In addition, the hydrogen production increases and an intermediate product required in a Fischer-Tropsch reaction ($H_2/CO$ ratio is about 2) may be more easily prepared.

For example, a $CO_2$ conversion rate of about 90 to 100% based on the equilibrium conversion rate may be obtained when a $CO_2$ reforming reaction is performed using the $CO_2$ reforming catalyst composition.

Along with the high temperature dry reaction of Reaction Scheme 1 or the wet reaction of Reaction Scheme 2, coke may be generated on the catalyst by the following reactions 1 and 2 to degrade catalyst performance.

$$CH_4 \leftrightarrow C + 2H_2 \quad \Delta Ho = 122.3 \text{ kJ/mol} \qquad (1)$$

$$2CO \leftrightarrow C + CO_2 \quad \Delta Ho = -125.2 \text{ kJ/mol} \qquad (2)$$

Reaction 1, which is a methane decomposition reaction ($CH_4$ cracking), is a leading cause of catalyst deactivation, and reaction 2, which is a Boudouard reaction, is of relatively little importance at an increased temperature. The carbon produced by the above reactions may reduce a reaction surface area of the catalyst, block the pores of the supporter, and make contact of the reaction gas with the catalyst difficult, thereby causing deactivation of the catalyst.

Since the $CO_2$ reforming catalyst composition may increase the methane conversion rate by effectively reacting the water absorbed in the hydroxyl groups located around the catalyst reaction point with methane to produce a greater quantity of hydrogen, the composition may remarkably decrease the coking by Reaction 1 to reduce production of carbon or more easily remove the produced carbon. As a result, the life span and durability of the composite porous catalyst may be improved.

Meanwhile, the catalyst may be recycled by the following Reaction 3 and Reaction 4.

$$C_{adsorption} + CO_2 \rightarrow 2CO \quad (3)$$

$$C_{adsorption} + H_2O \rightarrow CO + H_2 \quad (4)$$

Since the water absorbed in the hydroxyl groups adjacent to the composite porous catalyst more easily reacts with the carbon adsorbed in the composite porous catalyst in the $CO_2$ reforming catalyst composition, the catalyst recycling reaction by Reaction (4) may be accelerated.

For example, the amount of carbon deposition per 1 g of the composite porous catalyst may be about 0.01 to 0.1 mg/hr when the $CO_2$ reforming reaction is performed using the $CO_2$ reforming catalyst composition at about 700° C.

In the composite porous catalyst of the $CO_2$ reforming catalyst composition, a porous supporter having a relatively large specific surface area may be desirable. For example, the porous supporter may have a specific surface area of about 50 to 1000 m²/g.

In the composite porous catalyst of the $CO_2$ reforming catalyst composition, the $CO_2$ reforming reaction may be performed, which results in the porous supporter having desirably larger pores. The pores formed in the porous supporter may have irregular shapes. A maximum value of pore diameters measured in a random direction is determined as a maximum diameter of the pores, for example, the pores of the porous supporter may have an average maximum diameter of about 2 to 50 nm.

The activity of the $CO_2$ reforming catalyst composition may be influenced by the concentration of the supported catalyst metal. For example, in the $CO_2$ reforming catalyst composition, the composite porous catalyst may include the supported catalyst metal in the loading of about 2 to 15 wt %. When the composite porous catalyst includes the supported catalyst metal in the concentration of the above range, a predetermined or given conversion rate and yield may be achieved by a catalyst reaction.

Hereinafter, the embodiments are illustrated in more detail with reference to examples. However, the following are example embodiments and are not limiting.

Example

Comparative Example 1

A Ni catalyst is prepared by impregnation using γ-$Al_2O_3$ (specific surface area: 150 m²/g, Alfa Company) as a supporter. Specifically, about 6.9 g of nickel nitrate hexahydrate (Ni(NO₃)₂·6H₂O, Samchun Chemical) and about 7 cc of distilled water are mixed, and the mixture is dried in an oven of about 110° C. for about 12 hours to prepare 7 wt % Ni/$Al_2O_3$. The prepared 7 wt % Ni/$Al_2O_3$ is heat-treated at about 700° C. for about 1 hour.

Example 1

About 30 g of P-123 (BASF) and about 30 g of butanol are mixed with about 1,085 g of water, and about 59 g of HCl and about 64.5 g of tetraethylorthosilicate (TEOS) are added thereto. The mixture is agitated at about 35° C. for about 24 hours, and aged in an oven at about 100° C. for about 24 hours. After the water is filtered out, the mixture is dried at about 80° C. Subsequently, the mixture is washed with a mixed solution of ethanol and hydrochloric acid, the ethanol is filtered, and the mixture is dried at about 80° C. and baked at about 550° C. for about 3 hours. Thereby, mesoporous silica having regular pores in the size range of about 4 to 15 nm, an average pore size of about 7 nm and including a hydroxyl group arranged inside the silica is prepared.

To measure the hydroxyl group in the mesoporous silica, a triethylaluminum titration method is used. The mesoporous silica is introduced in a reactor in a glove box, an excessive amount of triethylaluminum is added, and the silica and triethylaluminum are mixed in a mixer for about 10 hours. A substitution reaction between the protons of the hydroxyl group and the ethyl group of the triethylaluminum occurs to produce ethane. Subsequently, 1-pentanol is added to remove a remaining ethyl group. The pressure and volume of the finally produced ethane are measured and the concentration of substituted ethane is calculated using an ideal gas equation. The hydroxyl group concentration of the mesoporous silica is measured to be about 0.8 mmol/g.

The temperature of the mesoporous silica is slowly raised (by about 1.5° C./min), and the mesoporous silica is heat-treated at about 700° C. under a nitrogen atmosphere for about 1 hour.

The pore size distribution of the prepared mesoporous silica is measured using nitrogen adsorption-desorption equipment (TriStar 3000, Micromeritics Company).

Figure 6:
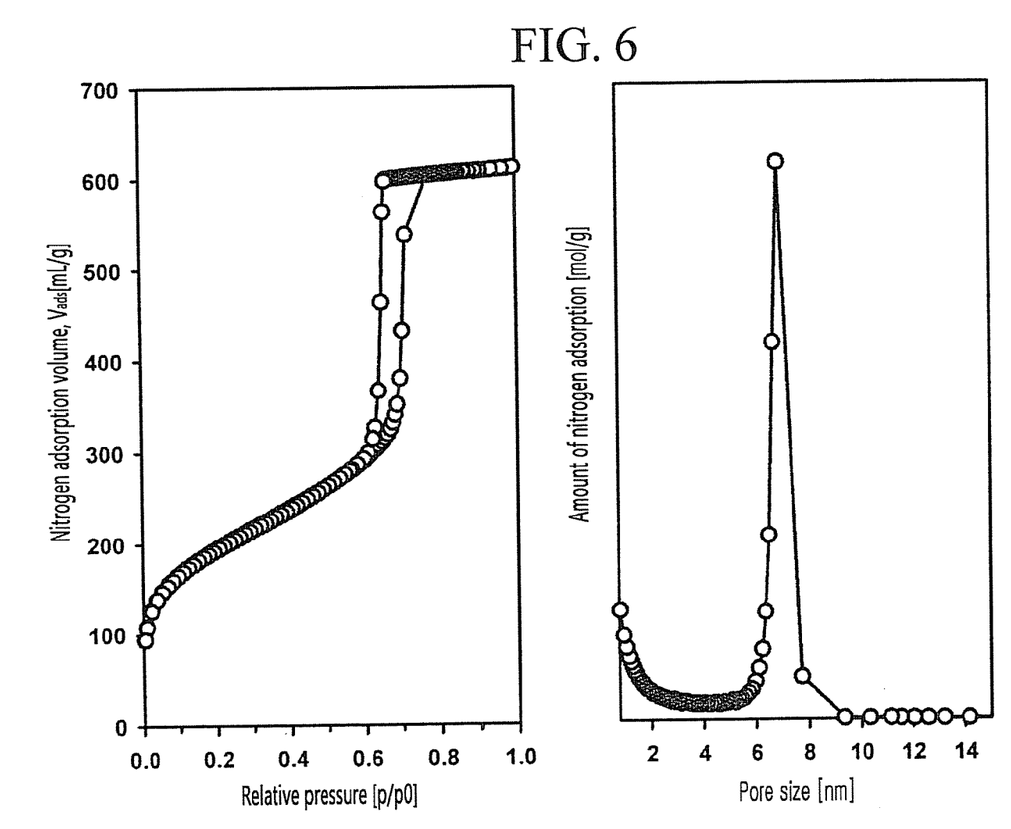
FIG. 6 is a graph showing the pore size distribution of mesoporous silica in the $CO_2$ reforming catalyst composition prepared in Example 1.

The measured nitrogen adsorption amount according to pressure (left graph) and the pore size distribution (right graph) of the mesoporous silica are shown in FIG. 6. A capillary condensation area exists in the mesoporous silica, and in the pore distribution diagram calculated from the isothermal data using a BJH model suitable for measuring mesopore size, the average pore size is about 7 nm.

The above-prepared mesoporous silica and 7 wt % Ni/$Al_2O_3$ prepared in Comparative Example 1 are mixed in a weight ratio of about 3:7 to prepare a $CO_2$ reforming catalyst composition.

Experimental Example 1

For about 0.45 g of the $CO_2$ reforming catalyst composition prepared in Example 1 and about 0.45 g of the catalyst prepared in Comparative Example 1, reduction is performed with hydrogen at about 700° C. for about 1 hour, a $CO_2$ reforming reaction of the following Reaction Scheme 1 is performed at about 700° C. for about 2 hours, and about 0.1 cc/min and about 0.2 cc/min of water are respectively introduced after about 10 minutes and 30 minutes to perform a $CO_2$ reforming reaction of Reaction Scheme 2.

$$CH_4 + CO_2 \rightarrow 2CO + 2H_2 \quad \Delta H_o = 247.3 \text{ kJ/mol} \quad \text{[Reaction Scheme 1]}$$

$$3CH_4 + CO_2 + 2H_2O \rightarrow 4CO + 8H_2 \quad \Delta H_o = 219 \text{ kJ/mol} \quad \text{[Reaction Scheme 2]}$$

The reactant (methane:$CO_2$:nitrogen=about 1:1:1 flow rate) has a gas space speed (GHSV) of about 53,000 hr$^{-1}$, and water is introduced in the form of vapor at about 0.1 cc/min and 0.2 cc/min, respectively, for about 10 minutes to about 30 minutes after the reaction and passes a section having a predetermined or given temperature of about 120° C.

The conversion rate of the reactant and the concentrations of the produced hydrogen and CO are measured with a gas analyzer.

Figure 1:
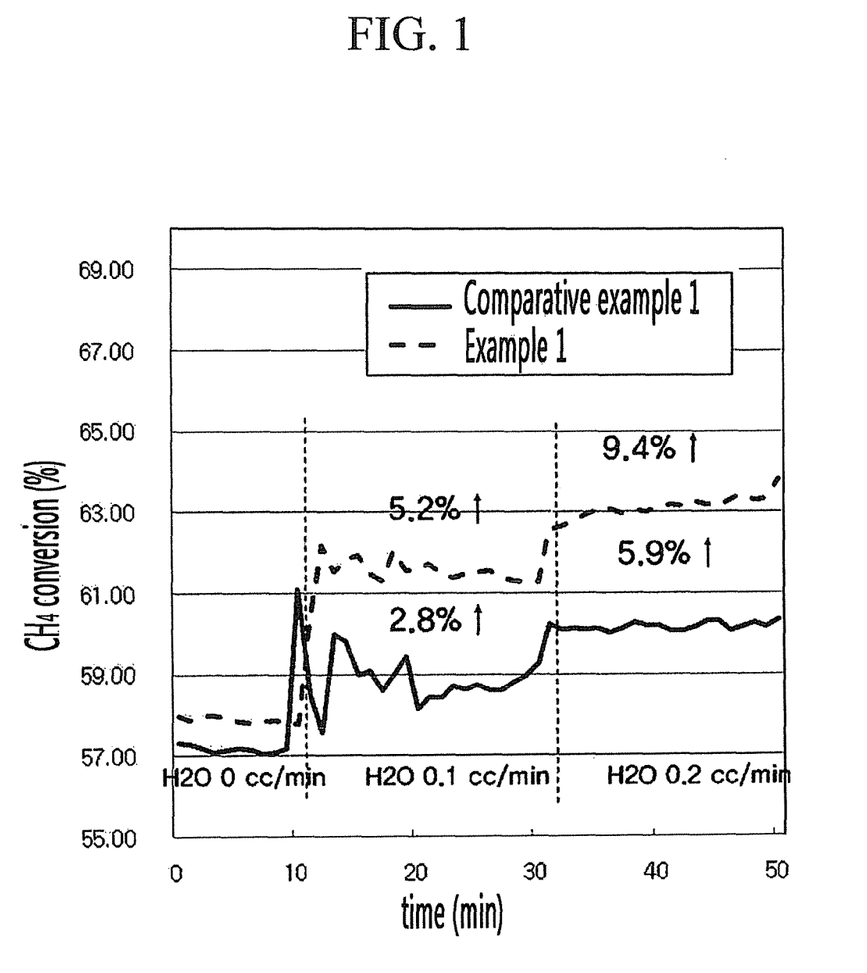
FIG. 1 is a graph showing $CH_4$ conversion rate over time when a $CO_2$ reforming reaction is performed using the $CO_2$ reforming catalyst composition prepared in Example 1 and the catalyst prepared in Comparative Example 1.

FIG. 1 is a graph showing the conversion rate of $CH_4$ over time in Experimental Example 1. In case water is respectively added at about 0.1 cc/min and about 0.2 cc/min in the wet $CO_2$ reforming reaction (Reaction Scheme 2), Example 1 shows a higher $CH_4$ conversion rate than Comparative Example 1, because a vapor reforming reaction ($CH_4+H_2O \rightarrow CO+3H_2$) actively occurs along with a $CO_2$ reforming reaction. At this time, water may be efficiently provided from the large quantity of water adsorbed in the hydroxyl groups of the mesoporous silica of Example 1.

Figure 2:
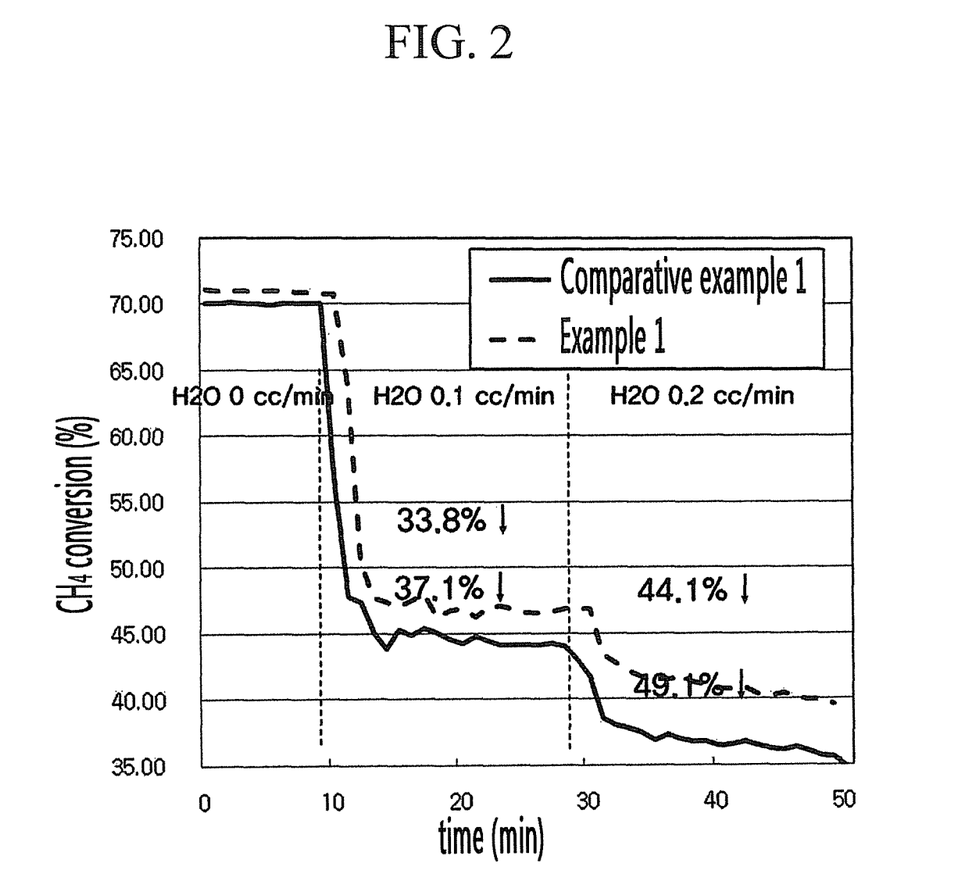
FIG. 2 is a graph showing $CO_2$ conversion rate over time when a $CO_2$ reforming reaction is performed using the $CO_2$ reforming catalyst composition prepared in Example 1 and the catalyst prepared in Comparative Example 1.

FIG. 2 is a graph showing the conversion rate of $CO_2$ over time. Example 1 shows a small reduction in the $CO_2$ conversion rate in the wet $CO_2$ reforming reaction, compared to Comparative Example 1. The added water reacts with the carbon adsorbed in the catalyst by the Reaction (4) ($C_{adsorption}$ $H_2O \rightarrow CO+H_2$) to perform a catalyst recycling reaction, and a greater quantity of carbon monoxide and hydrogen are produced.

Therefore, according to Example 1 which uses a porous oxide including a relatively large amount of hydroxyl groups, an efficient reaction may be performed using a relatively small amount of water in the wet $CO_2$ reforming reaction, which may result in an increase in the conversion rate and removal of carbon adsorbed in the catalyst.

Figure 3:
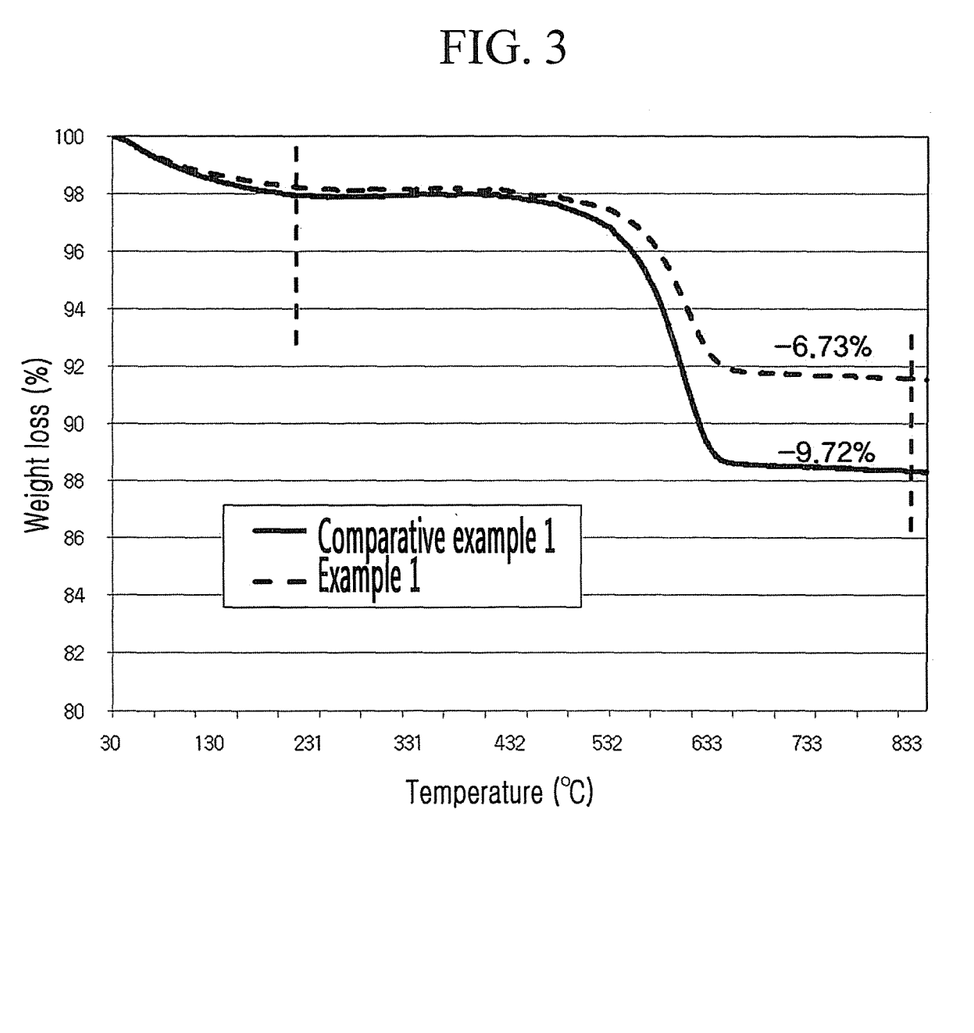
FIG. 3 is a graph showing the amount of carbon deposition after $CO_2$ reaction using the $CO_2$ reforming catalyst composition prepared in Example 1 and the catalyst prepared in Comparative Example 1.

FIG. 3 is a graph showing the amount of carbon deposition after the $CO_2$ reforming reaction of Example 1 and Comparative Example 1 in Experimental Example 1. The deposition amount of carbon produced in the $CO_2$ reforming reaction may be quantified by measuring the amount of carbon that may be measured between the temperatures of about 200° C. and about 830° C. In Example 1 (about 6.73 wt % weight loss), a smaller amount of carbon is deposited in the catalyst than Comparative Example 1 (about 9.72 wt % weight loss).

Figure 4:
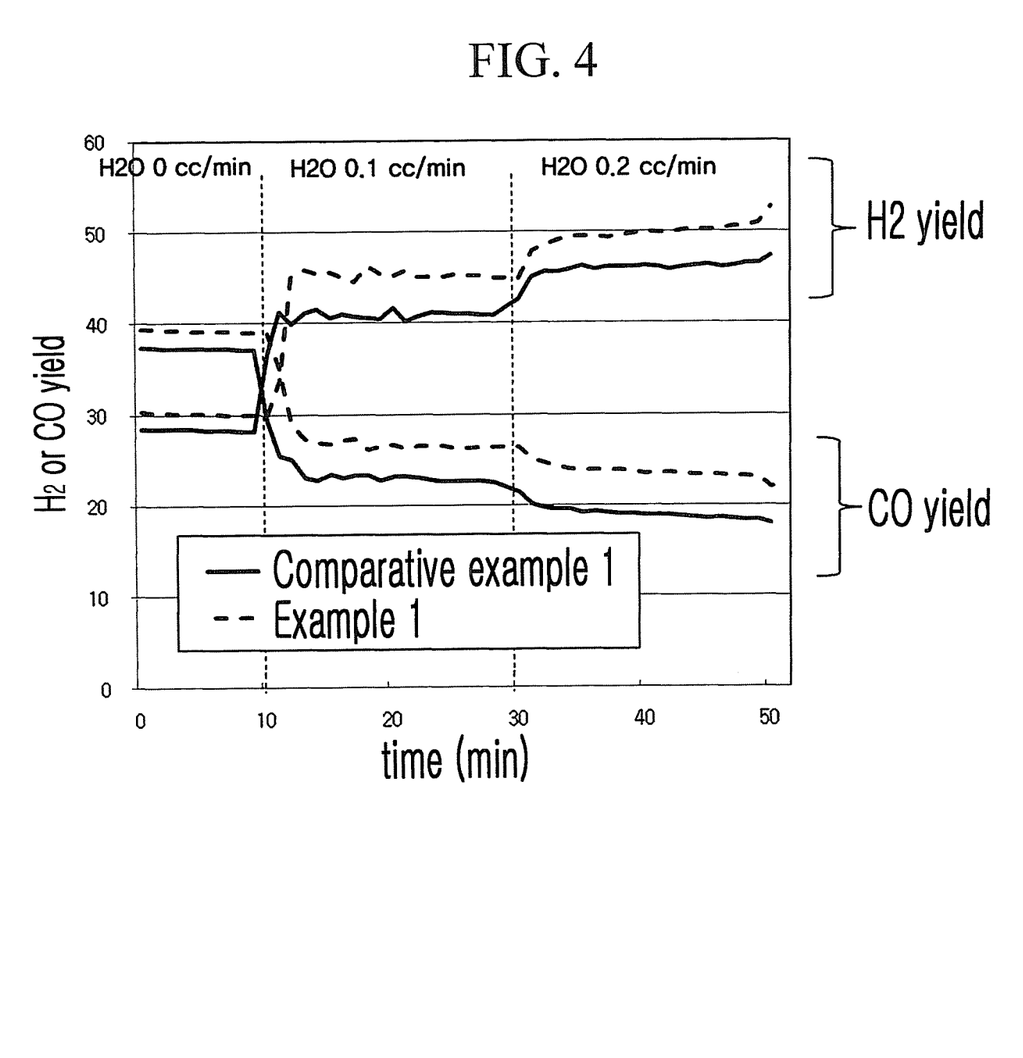
FIG. 4 is a graph showing hydrogen or carbon monoxide yield over time when a $CO_2$ reforming reaction is performed using the $CO_2$ reforming catalyst composition prepared in Example 1 and the catalyst prepared in Comparative Example 1.

FIG. 4 is a graph showing the yield over time in Experimental Example 1. Herein, the hydrogen yield is a concentration ratio of produced hydrogen to reacted methane, and the carbon monoxide yield is a concentration ratio of produced carbon monoxide to methane and carbon dioxide involved in the reaction. When examining the hydrogen yield before water introduction (about 0 to 10 minutes), when introducing water at about 0.1 cc/min (about 10 to 30 minutes), and when introducing water at about 0.2 cc/min (after about 30 minutes), Example 1 shows the results of about 30%, 45%, and 50%, respectively, and Comparative Example 1 shows the results of about 28%, 41%, and 46%, respectively. Similarly, when examining the carbon monoxide yield, Example 1 shows the results of about 39%, 27%, and 24%, respectively, and Comparative Example 1 shows the results of about 37%, 23%, and 19%, respectively. Example 1 shows a higher hydrogen yield than Comparative Example 1 because the water adsorbed in the hydroxyl groups of the supporter is efficiently used in the $CO_2$ reforming reaction and the vapor reforming reaction. Example 1 also shows less decrease in carbon monoxide yield than Comparative Example 1 because more carbon monoxide and hydrogen are produced by the catalyst recycling reaction than reaction (4).

Experimental Example 2

Figure 5:
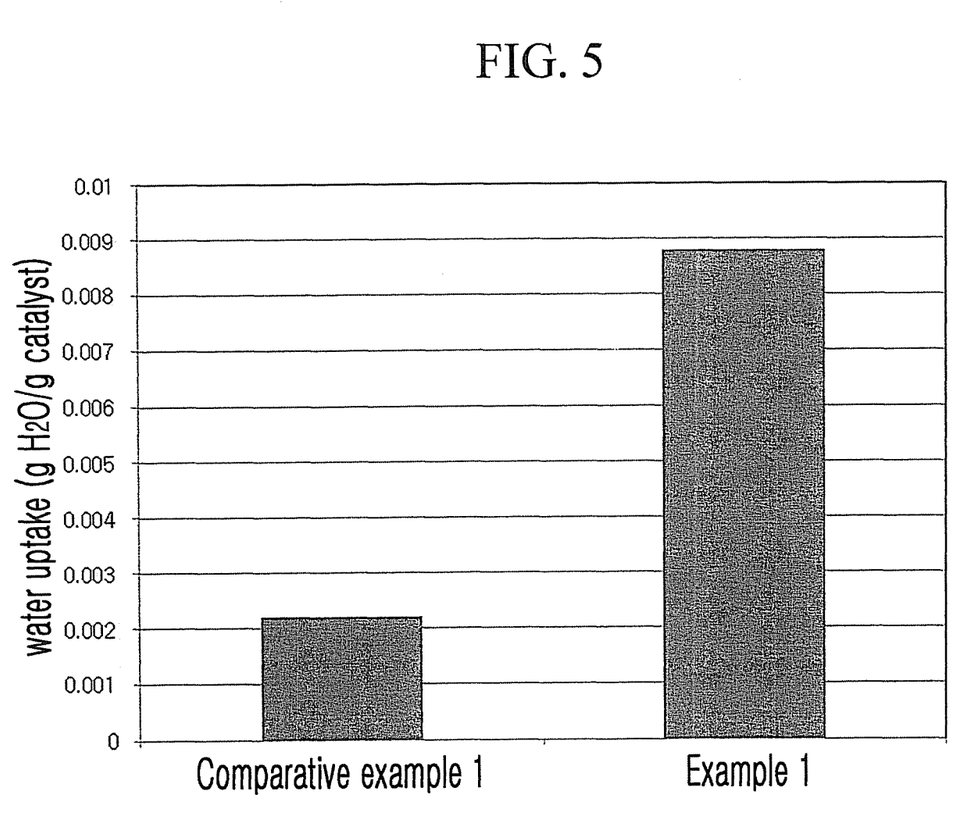
FIG. 5 is a graph showing the amount of water remaining in the catalyst after a measurement experiment of water-retaining capacity of the $CO_2$ reforming catalyst composition prepared in Example 1 and the catalyst prepared in Comparative Example 1.

The $CO_2$ reforming catalyst composition prepared in Example 1 and the catalyst prepared in Comparative Example 1 are respectively dried at about 120° C. for about 10 hours, about 0.5 g of water is identically added, the mixtures are dried at about 100° C. for about 4 hours, and the weights of the samples are measured to measure the amount of remaining water in the catalysts. The measurement results are shown in FIG. 5. It is confirmed that Example 1 holds a larger amount of water, and thus water may be used more efficiently when performing the reforming reaction of Reaction Scheme 2.

It should be understood that example embodiments described therein should be considered in a descriptive sense only and not for purposes of limitation. Descriptions of features or aspects within each example embodiment should typically be considered as available for other similar features or aspects in other embodiments.

What is claimed is:

1. A $CO_2$ reforming catalyst composition, comprising:
    a hydroxyl group-containing porous oxide, the hydroxyl group-containing porous oxide including about 0.3 to 3.0 mmol/g of hydroxyl groups; and
    a composite porous catalyst supported by a porous supporter, the composite porous catalyst including a catalyst metal.

2. The $CO_2$ reforming catalyst composition of claim 1, wherein the weight ratio of the hydroxyl group-containing porous oxide and the composite porous catalyst is about 5:5 to 1:9.

3. The $CO_2$ reforming catalyst composition of claim 1, wherein the hydroxyl group-containing porous oxide and the porous supporter are independently selected from the group consisting of silica, alumina, clay, zeolite, and combinations thereof.

4. The $CO_2$ reforming catalyst composition of claim 1, wherein the hydroxyl group-containing porous oxide is selected from the group consisting of mesoporous silica, mesoporous zeolite, alumina aerosol, and combinations thereof.

5. The $CO_2$ reforming catalyst composition of claim 1, wherein the catalyst metal is selected from the group consisting of Ni, Co, Cr, Mn, Mo, Ce, Zr, Fe, Ir, K, Ca, Mg, La, Sr, Cu, Zn, Pd, Pt, Ru, Rh, Au, and combinations thereof.

6. The $CO_2$ reforming catalyst composition of claim 1, wherein the porous supporter has a specific surface area of about 50 to 1000 m$^2$/g.

7. The $CO_2$ reforming catalyst composition of claim 1, wherein pores of the porous supporter have an average maximum diameter of about 2 to 50 nm.

8. The $CO_2$ reforming catalyst composition of claim 1, wherein the composite porous catalyst includes the supported catalyst metal in a concentration of about 2 to 15 wt %.

9. The $CO_2$ reforming catalyst composition of claim 1, wherein an amount of carbon deposition is about 0.01 to 0.1 mg/hr per 1 g of the composite porous catalyst when a $CO_2$ reforming reaction is performed at 700° C. using the $CO_2$ reforming catalyst composition.

10. The $CO_2$ reforming catalyst composition of claim 1, wherein a $CO_2$ conversion rate of about 90 to 100% based on an equilibrium conversion rate is obtained when a $CO_2$ reforming reaction is performed using the $CO_2$ reforming catalyst composition.

* * * * *